United States Patent
Tsai et al.

(10) Patent No.: US 7,215,043 B2
(45) Date of Patent: May 8, 2007

(54) POWER SUPPLY VOLTAGE SWITCH CIRCUIT

(75) Inventors: Hong-Ping Tsai, Kao-Hsiung (TW); Yu-Ming Hsu, Hsin-Chu (TW)

(73) Assignee: eMemory Technology Inc., Science Park, Hsin-Chu (TW)

( * ) Notice: Subject to any disclaimer, the term of this patent is extended or adjusted under 35 U.S.C. 154(b) by 473 days.

(21) Appl. No.: 10/707,647

(22) Filed: Dec. 30, 2003

(65) Prior Publication Data

US 2005/0146230 A1 Jul. 7, 2005

(51) Int. Cl.
- *H03K 17/00* (2006.01)
- *H02J 1/00* (2006.01)
- *H01H 67/00* (2006.01)
- *H01H 63/00* (2006.01)

(52) U.S. Cl. .................. 307/130; 326/68; 327/408; 327/534

(58) Field of Classification Search ............. 307/130; 326/68; 327/408, 534

See application file for complete search history.

(56) References Cited

U.S. PATENT DOCUMENTS

| | | | | |
|---|---|---|---|---|
| 5,122,692 A | * | 6/1992 | Seki | ............... 326/67 |
| 6,133,777 A | * | 10/2000 | Savelli | ............ 327/410 |
| 6,567,067 B2 | * | 5/2003 | Azami | ............. 345/100 |
| 6,774,704 B2 | * | 8/2004 | Kushnarenko | ....... 327/530 |
| 2003/0222678 A1 | * | 12/2003 | Sun | ............... 326/68 |

* cited by examiner

*Primary Examiner*—Brian Sircus
*Assistant Examiner*—Hal I. Kaplan
(74) *Attorney, Agent, or Firm*—Winston Hsu

(57) ABSTRACT

A power supply voltage switch circuit for selecting a power supply voltage of an integrated circuit according to a first control signal. The power supply voltage switch circuit contains a high voltage selecting module for generating an output voltage according to the higher of a first and a second voltages; a level shifting module electrically connected to the high voltage selecting module to receive the output voltage as power supply, for performing level shifting to a first control signal according to the output voltage; and a selecting switch module electrically connected to the level shifting module for selectively outputting the first or the second voltage as the power supply voltage of the integrated circuit according to the level-shifted first control signal.

12 Claims, 2 Drawing Sheets

POWER SUPPLY VOLTAGE SWITCH CIRCUIT

BACKGROUND OF INVENTION

1. Field of the Invention

The invention generally relates to a power supply voltage switching circuit, and more particularly, to a power supply voltage switching circuit having a high voltage selecting module.

2. Description of the Prior Art

In certain application of IC technology, situations might occur where a different power supply voltage is required for operating in different modes, such as non-volatile flash memory. In prior art, a power supply voltage switch circuit is often used to accomplish the switching of different power supply voltages in different operating modes.

Please refer to FIG. 1, which shows a schematic diagram of a conventional power supply voltage switching circuit 10 according to prior art. The power supply voltage switching circuit 10 comprises a level shifting module 12 for shifting the level of the input signal to a comparatively high level before outputting the signal. In FIG. 1, the level shifting module 12 comprises two level-shifters 14 and 16 for respectively shifting levels of the two input signals, wherein the voltage level of the comparatively high level signal after level shifting is determined by the power supply voltage of the level-shifters 14 and 16. The power supply voltage switching circuit 10 further comprises a selecting switch module 18, where the selecting switch module 18 in FIG. 1 is made up of a first p-type MOS transistor 20 and a second p-type MOS transistor 22. The selecting switch module 18 selects from either a first voltage $V_{PP}$ or a second voltage $V_{DD}$ to generate a power supply voltage $V_{PS}$ for an integrated circuit according to the comparatively high level signals generated by the level shifting module 12.

In the actual application, the level of the first voltage $V_{PP}$ is usually the level after charge pumping such as 7V~0V and the second voltage $V_{DD}$ is usually the standard voltage used in common integrated circuits such as 3V~0V. Therefore, generally speaking, if the integrated circuit wishes to operate at a different voltage mode, a control circuit (not shown in FIG. 1) generates a first control signal ENVPP to control the power supply voltage switching circuit 10 in generating the desired power supply voltage $V_{PS}$. In FIG. 1, besides the first control signal ENVPP, the control circuit can also generate a second control signal ENVDD which is a complementary signal of the first control signal ENVPP, for controlling the power supply voltage switching circuit 10. The power supply voltage of the control circuit is the standard voltage so the level of both the first control signal ENVPP and the second control signal ENVDD is within the standard range (3V~0V).

As previously mentioned, the level of the shifted comparatively high level signal from the level shifting module 12 corresponds to the power supply voltage of the level-shifters 14 and 16. In FIG. 1, the power supply voltage of the level-shifters 14 and 16 is the first voltage $V_{PP}$, therefore the level of the first control signal ENVPPHV and the second control signal ENVDDHV after level shifting is comparatively high (7V~0V) which is used to control the operation of the third and fourth p-type MOS transistors 20, 22 in the selecting switch module 18.

In the above-mentioned configuration, the power supply voltage switching circuit 10 can generate a power supply voltage $V_{PS}$ from the first voltage $V_{PP}$ and the second voltage $V_{DD}$ according to the control of the first control signal ENVPP and the second control signal ENVDD. If the first voltage $V_{PP}$ is chosen to be the power supply voltage $V_{PS}$, the control circuit sets the first control signal ENVPP to a logic value of 0 (i.e. 0V) and the second control signal ENVDD to a logic value of 1 (i.e. 3V). After the level shift by the level shifting module 12, the first control signal ENVPP remains 0V but the second control signal ENVDD becomes 7V, and both are inputted to the selecting switch module 18. At the same time, the first voltage $V_{PP}$ is 7V and the second voltage $V_{DD}$ is 3V so the third p-type MOS transistor 20 is switched on and the fourth p-type MOS transistor 22 is switched off. As a result the power supply voltage $V_{PS}$ will output the value of the first voltage $V_{PP}$ (i.e. 7V). Oppositely if the second voltage $V_{DD}$ is chosen to be the power supply voltage $V_{PS}$, the control circuit sets the first control signal ENVPP to a logic value of 1 (i.e. 3V) and the second control signal ENVDD to a logic value of 0 (i.e. 0V). After the level shift by the level shifting module 12, the first control signal ENVPP becomes 7V but the second control signal ENVDD remains 0V, and both are inputted to the selecting switch module 18. At the same time, the first voltage $V_{PP}$ is 7V and the second voltage $V_{DD}$ is 3V so the third p-type MOS transistor 20 is switched off and the fourth p-type MOS transistor 22 is switched on. As a result the power supply voltage $V_{PS}$ will output the value of the second voltage $V_{DD}$ (i.e. 3V).

Furthermore, the above operation takes into the assumption that the value of the first voltage $V_{PP}$ does not change. However in certain circuits, it is possible that the value of the first voltage $V_{PP}$ cannot always be maintained at a charge-pumped level, an example is the sharing of a pad between a charge-pumped voltage (such as $V_{PP}$) and other signals. In this condition, the value of the first voltage $V_{PP}$ can be at a comparatively low level or even become 0V or floating in some situations. The level-shifters 14 and 16 of the level shifting module 12 use the first voltage $V_{PP}$ as the power supply voltage which renders the selecting switch module 18 unable to operate properly, or renders the third and fourth p-type MOS transistors 20 and 22 to be switched on at the same time causing the first voltage $V_{PP}$ and the second voltage $V_{DD}$ to short circuit which wastes energy.

SUMMARY OF INVENTION

It is therefore an objective of the claimed invention to provide a power supply voltage switching circuit having a high voltage selecting module to solve the above-mentioned problem.

The claimed invention discloses a power supply voltage switching circuit for selecting a power supply voltage for an integrated circuit according to a first control signal, the circuit comprising: a high voltage selecting module for generating an output voltage according to a higher one of a first voltage and a second voltage; a level shifting module, being electrically coupled to the high voltage selecting module for inputting the output voltage as the power supply voltage, for shifting a level of the first control signal according to the output voltage; and a selecting switch module, being electrically coupled to the level shifting module, for selectively outputting the first voltage or the second voltage as the power supply voltage of the integrated circuit according to the level-shifted first control signal.

The claimed invention discloses a high voltage selecting circuit comprising: a first transistor where a first terminal of the first transistor is electrically coupled to a first voltage, a second terminal of the first transistor is electrically coupled to an output junction, and a gate of the first transistor is electrically coupled to a second voltage; and a second transistor where a first terminal of the second transistor is electrically coupled to the second voltage, a second terminal of the second transistor is electrically coupled to the output junction, and a gate of the second transistor is electrically coupled to the first voltage; wherein the high voltage selecting circuit selectively generates an output voltage according to a higher one of the first voltage and the second voltage.

The claimed invention discloses a high voltage selecting circuit to supply power to the level-shifters according to an output voltage generated from either a first voltage or a second voltage. Therefore no matter how the level of the first voltage changes, the control signals after level-shifting can ensure the level is enough to allow the power supply voltage switching circuit to operate properly.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
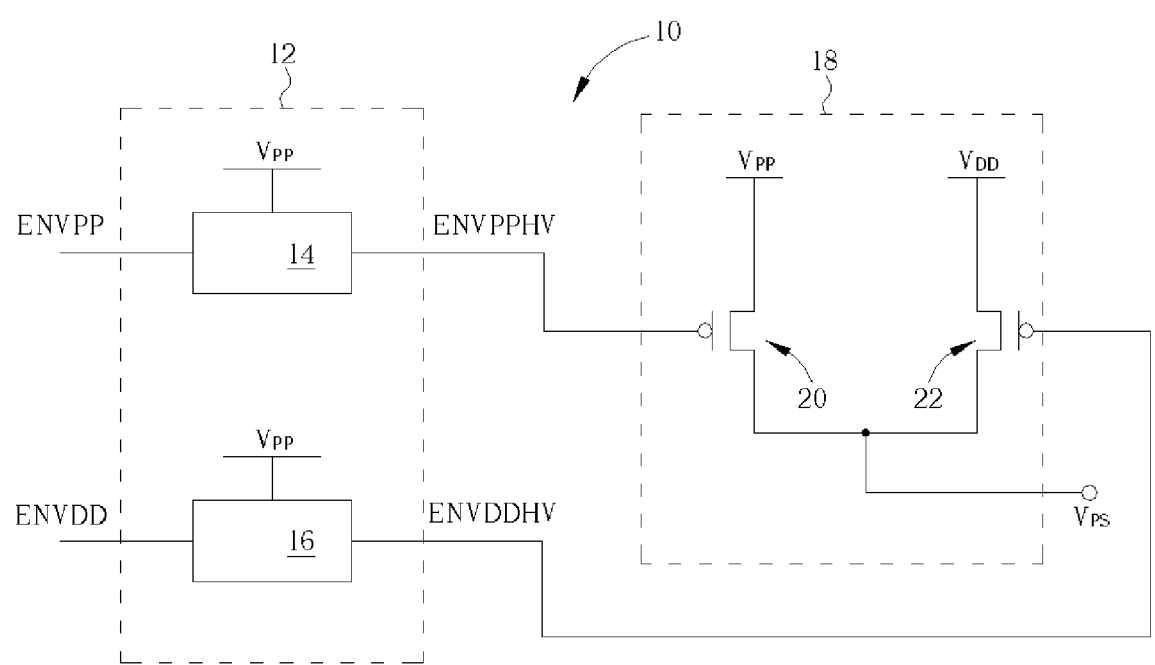
FIG. 1 is a schematic diagram of a conventional power supply voltage switching circuit according to prior art.
Figure 2:
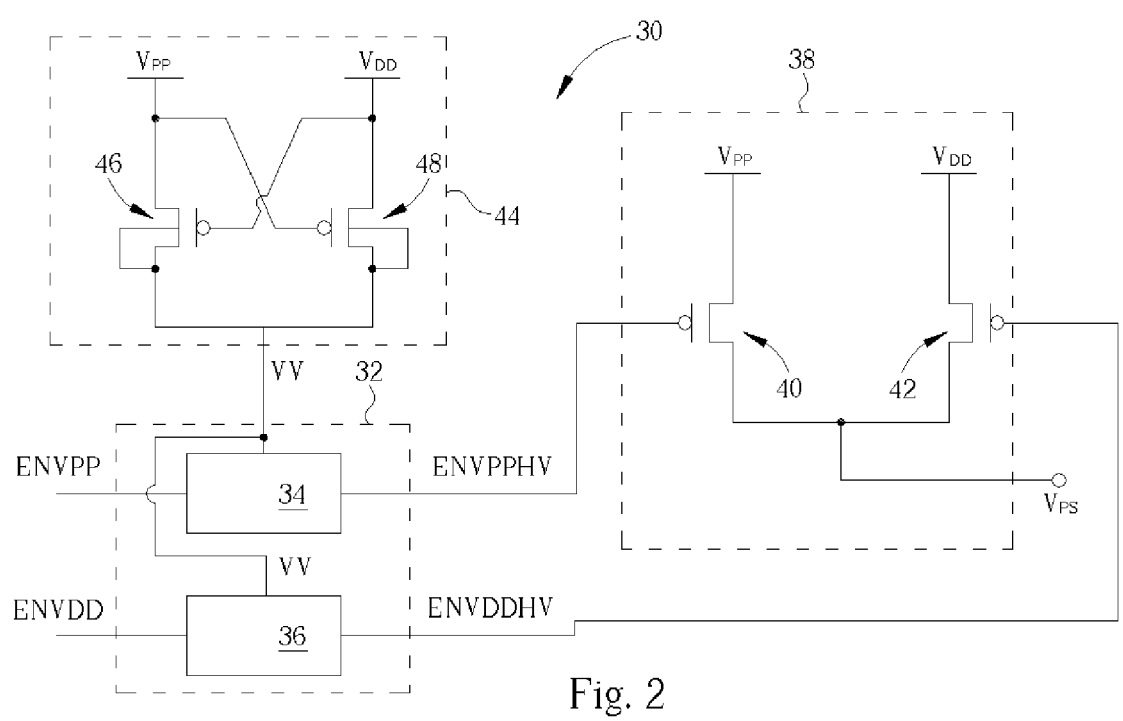
FIG. 2 is a schematic diagram of the power supply voltage switching circuit according to a preferred embodiment of the present invention.

Please refer to FIG. 2, which is a schematic diagram of the power supply voltage switching circuit 30 of the present invention. In FIG. 2, the power supply voltage switching circuit 30 comprises a level shifting module 32 and a selecting switch module 38 wherein the level shifting module 32 shifts the level of the input signal to a higher level. In this preferred embodiment, the level shifting module 32 comprises level-shifters 34 and 36 which are used to respectively shift levels of the two input signals (i.e. the first control signal ENVPP and the second control signal ENVDD). The level of the comparatively high level signal after the level shift is dependent on the power supply voltage of the level shifter 34 and 36. The selecting switch module 38 electrically coupled to the level shifting module 32 is for selectively choosing the first voltage $V_{PP}$ or the second voltage $V_{DD}$ to be the power supply voltage $V_{PS}$ of the integrated circuit according to the level-shifted first control signal ENVPPHV and second control signal ENVDDHV.

In this embodiment, the selecting switch module 38 comprises a third p-type MOS transistor 40 where the source is electrically coupled to the first voltage $V_{PP}$, the drain is electrically coupled to a supply node, and the gate is electrically coupled to the level-shifted first control signal ENVPPHV; a fourth p-type MOS transistor 42 where the source is electrically coupled to the second voltage $V_{DD}$, the drain is electrically coupled to the supply node, and the gate is electrically coupled to the level-shifted second control signal ENVDDHV (i.e. the complementary signal of the level-shifted first control signal ENVPPHV). The selecting switch module 38 generates the power supply voltage $V_{PS}$ for the integrated circuit at the supply node according to the level-shifted first control signal ENVPPHV and second control signal ENVDDHV.

The power supply voltage switching circuit 30 of the present invention further comprises a high voltage selecting module 44. In this embodiment, the high voltage selecting module 44 comprises a first p-type MOS transistor 46 where the source is electrically coupled to a first voltage $V_{PP}$, the drain is electrically coupled to an output node, and the gate is electrically coupled to a second voltage $V_{DD}$; and a second p-type MOS transistor 48 where the source is electrically coupled to the second voltage $V_{DD}$, the drain is electrically coupled to the output node, and the gate is electrically coupled to the first voltage $V_{PP}$. The high voltage selecting module 44 generates an output voltage VV according to the higher of the first voltage $V_{PP}$ and the second voltage $V_{DD}$ and sends the output voltage VV to the level shifting module 32 to be the power supply voltage for the level-shifters 34 & 36.

It is to be noted that in this embodiment, the first p-type MOS transistor 46 further comprises a well which is electrically coupled to the drain of the first p-type MOS transistor 46. The second p-type MOS transistor 48 also further comprises a well which is electrically coupled to the drain of the second p-type MOS transistor 48. Furthermore for simplification in explanation, it is assumed that the sizes of the first p-type MOS transistor 46 and the second p-type MOS transistor 48 are identical but not limited to what is disclosed. Moreover the well being electrically coupled to the drain is only one design choice of this embodiment which also comprises the situation where the connection is not available.

Under the configuration of the high voltage selecting module 44 in this embodiment, if the absolute value of the difference between the first voltage $V_{PP}$ and the second voltage $V_{DD}$ is greater than the threshold voltage $V_{TH}$ of the transistors 46, 48, the voltage difference between the source and the gate will be greater than the threshold voltage so the channel is conducting, therefore the output voltage VV is substantially the greater one of the first voltage $V_{PP}$ and the second voltage $V_{DD}$. If the absolute value of the difference between the first voltage $V_{PP}$ and the second voltage $V_{DD}$ is smaller than or equal to the threshold voltage $V_{TH}$ of the transistors 46, 48, in view of fact that the wells of the transistors 46, 48 are respectively electrically coupled to the drain of the transistors 46, 48, although the channel is not conducting due to the difference between the source and the gate being smaller than or equal to the threshold voltage. Because of the existence of a PN junction between the source and the well (i.e. the drain), the output voltage VV is substantially the higher one of the first voltage $V_{PP}$ and the second voltage $V_{DD}$ minus the junction voltage $V_D$ that is between the source and the well (i.e. the diode voltage of an equivalent diode formed by the source and the well).

As mentioned above, the output voltage VV generated by the high voltage selecting module 44 supplies the power supply voltage for the level shifting module 32. Therefore, even when the problem mentioned in the related prior art happens, i.e. when the first voltage $V_{PP}$ is at a lower level or even at 0V, the control signals ENVPPHV and ENVDDHV generated by the level shifting module 32 will not be overly low causing the power supply voltage switching circuit 30 to malfunction. The following is an actual example describing the operation of the power supply voltage switching circuit 30. It is to be noted that in the following example, it is assumed that the threshold voltage $V_{TH}$=0.7V for the first and second p-type MOS transistor 46 and 48 and the junction voltage $V_D$=0.65V between the source and the well. Generally speaking, to take body effect into account, the threshold voltage of a MOS transistor is slightly larger than the junction voltage between the source and the well.

First assume the first voltage $V_{PP}$ is 1V and the second voltage $V_{DD}$ is 3V. In this situation, the first p-type MOS transistor 46 is switched off and the second p-type MOS transistor 48 is switched on so the output voltage VV equals the second voltage $V_{DD}$ which is 3V.

The power supply voltage of the level-shifters 34 and 36 is 3V so when the first voltage $V_{PP}$ is to be chosen as the power supply voltage $V_{PS}$ the control circuit will set the logic value of the first control signal ENVPP to 0 (i.e. 0V) and the logic value of the second control signal ENVDD to 1 (i.e. 3V). After the level-shifting by the level shifting module 32, the first control signal ENVPPHV will be 0V and the second control signal ENVDDHV will be 3V and they are inputted to the selecting switch module 38. At this time, the first voltage $V_{PP}$ is 1V and the second voltage $V_{DD}$ is 3V so the third p-type MOS transistor 40 is switched on and the fourth p-type MOS transistor 42 is switched off. As a result, the power supply voltage $V_{PS}$ is the first voltage $V_{PP}$ (being 1V). Oppositely when the second voltage $V_{DD}$ is to be chosen as power supply voltage $V_{PS}$, the control circuit will set the logic value of the the first control signal ENVPP to 1 (i.e. 3V) and the logic value of the second control signal ENVDD to 0 (i.e. 0V). After the level-shifting by the level shifting module 32, the first control signal ENVPPHV will be 3V and the second control signal ENVDDHV will be 0V and they are inputted to the selecting switch module 38. At this time, the first voltage $V_{PP}$ is 1V and the second voltage $V_{DD}$ is 3V so the third p-type MOS transistor 40 is switched off and the fourth p-type MOS transistor 42 is switched on. As a result, the the power supply voltage $V_{PS}$ is the second voltage $V_{DD}$ (being 3V).

Following assume the first voltage is 3.5V and the second voltage is 3V. In this situation, the first p-type MOS transistor 46 is switched off and the second p-type MOS transistor 48 is switched off. Thus, the output voltage VV equals the second voltage $V_{DD}$ minus $V_D$, that is 3.5V−0.65V=2.85V because the first voltage $V_{PP}$ is connected to the output node through the PN junction that is formed between the source and the well.

The power supply voltage of the level-shifters 34 and 36 is 2.85V so when the first voltage $V_{PP}$ is to be chosen as the power supply voltage $V_{VS}$ the control circuit will set the logic value of the first control signal ENVPP to 0 (i.e. 0V) and the logic value of the second control signal ENVDD to 1 (i.e. 3V). After the level-shifting by the level shifting module 32, the first control signal ENVPPHV will be 0V and the second control signal ENVDDHV will be 2.85V and they are inputted to the selecting switch module 38. At this time, the first voltage $V_{PP}$ is 3.5V and the second voltage $V_{DD}$ is 3V so the third p-type MOS transistor 40 is switched on and the fourth p-type MOS transistor 42 is switched off. As a result, the power supply voltage $V_{PS}$ is the first voltage $V_{PP}$ (being 3.5V). Oppositely when the power supply voltage $V_{PS}$ is to be chosen as the second voltage $V_{DD}$, the control circuit will set the logic value of the first control signal ENVPP to 1 (i.e. 3V) and the logic value of the second control signal ENVDD to 0 (i.e. 0V). After the level-shifting by the level shifting module 32, the first control signal ENVPPHV will be 3V and the second control signal ENVDDHV will be 0V and they are inputted to the selecting switch module 38. At this time, the first voltage $V_{PP}$ is 3.5V and the second voltage $V_{DD}$ is 3V so the third p-type MOS transistor 40 is switched off and the fourth p-type MOS transistor 42 is switched on. As a result, the power supply voltage $V_{PS}$ is the second voltage $V_{DD}$ (being 3V).

The power supply voltage selecting circuit of the present invention uses a high voltage switching circuit to supply power to the level-shifters according to an output voltage generated from either a first voltage or a second voltage. Therefore no matter how the level of the first voltage changes, the control signal after level-shifting can ensure the level is enough to allow the power supply voltage switching circuit to operate properly to alleviate the problem in the prior art.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. A power supply voltage switching circuit for selecting a power supply voltage for an integrated circuit according to a first control signal, the circuit comprising:
    a high power auto selecting module for automatically generating an intermediate voltage according to a higher one of a voltage output by a first outer power pin and a second outer power pin which are directly connected to the high power auto selecting module at the same time without additional circuits or transistors, the high power auto selecting module comprising:
        a first transistor where a first terminal of the first transistor is electrically coupled to the first outer power pin without additional circuits or transistors, a second terminal of the first transistor is electrically coupled to an intermediate node, and a gate of the first transistor is directly connected to the second outer power pin without additional circuits or transistors; and
        a second transistor where a first terminal of the second transistor is directly connected to the second outer power pin without additional circuits or transistors, a second terminal of the second transistor is electrically coupled to the intermediate node, and a gate of the second transistor is directly connected to the first outer power pin without additional circuits or transistors;
    wherein the high power auto selecting module selectively generates an intermediate voltage according to a higher one of the voltages output by the first outer power pin and the second outer power pin which are directly connected to the first terminals and gates of the first and second transistors at the same time, and wherein the high power auto selecting module generates an intermediate voltage automatically with no additional control signal;
    a level shifting module electrically coupled to the high power auto selecting module for inputting the intermediate voltage as a power supply of the level shifting module, for performing level shift on the first control signal according to the intermediate voltage; and
    a selecting switch module electrically coupled to the level shifting module, for selectively outputting the voltage output by the first outer power pin or the voltage output by the second outer power pin as the power supply voltage of the integrated circuit according to the level-shifted first control signal.

2. The circuit in claim 1, wherein the first transistor is a p-type MOS transistor and the first terminal of the first transistor is a source and the second terminal of the first transistor is a drain.

3. The circuit in claim 1, wherein the second transistor is a p-type MOS transistor and the first terminal of the second transistor is a source and the second terminal of the second transistor is a drain.

4. The circuit in claim 1, wherein the first transistor further comprises a well and the well is electrically coupled to the second terminal of the first transistor.

5. The circuit in claim 1, wherein the second transistor further comprises a well and the well is electrically coupled to the second terminal of the second transistor.

6. The circuit in claim 1, wherein when an absolute value of a difference between the voltages output by the first outer power pin and the second outer power pin is larger than a threshold voltage of the first and second transistors, and the intermediate voltage is the higher voltage output by the first outer power pin and the second outer power pin.

7. The circuit in claim 1, wherein when an absolute value of a difference between the voltages output by the first outer power pin and the second outer power pin is smaller than a threshold voltage of the first and second transistors, the intermediate voltage is the higher voltage output by the first outer power pin and the second outer power pin minus a junction voltage between the first terminal and the well of the first transistor or the second transistor.

8. The circuit in claim 1, wherein the level shifting module further performs level shift on a second control signal according to the intermediate voltage, and the second control signal is complementary to the first control signal.

9. The circuit in claim 8, wherein the selecting switch module further comprises:
a third transistor where a first terminal of the third transistor is electrically coupled to the first outer power pin, a second terminal of the third transistor is electrically coupled to a supply node, and the gate of the third transistor is electrically coupled to the level-shifted first control signal; and a fourth transistor where a first terminal of the fourth transistor is electrically coupled to the second outer power pin, a second terminal of the fourth transistor is electrically coupled to the supply node, and a gate of the fourth transistor is electrically coupled to the level-shifted second control signal;

wherein the selecting switch module generates the power supply voltage for the integrated circuit at the supply node according to the level-shifted first and second control voltage.

10. The circuit in claim 9, wherein the third transistor is a p-type MOS transistor and the first terminal of the third transistor is a source and the second terminal of the third transistor is a drain.

11. The circuit in claim 9, wherein the fourth transistor is a p-type MOS transistor and the first terminal of the fourth transistor is a source and the second terminal of the fourth transistor is a drain.

12. The circuit in claim 1 wherein the voltages output by the first outer power pin and the second outer power pin are not related to one another in any way.

* * * * *